US007657146B2

(12) United States Patent
Laval et al.

(10) Patent No.: US 7,657,146 B2
(45) Date of Patent: Feb. 2, 2010

(54) OPTOELECTRIC HIGH FREQUENCY MODULATOR INTEGRATED ON SILICON

(75) Inventors: Suzanne Laval, Gif-sur-Yvette (FR); Delphine Marris, Montrouge (FR); Éric Cassan, Massy (FR); Daniel Pascal, Forges-les-Bains (FR)

(73) Assignees: Universite Paris-SUD, Orsay (FR); Centre National de la Recherche Scientifique - CNRS, Paris Cedex (FR)

( * ) Notice: Subject to any disclaimer, the term of this patent is extended or adjusted under 35 U.S.C. 154(b) by 0 days.

(21) Appl. No.: 11/547,550

(22) PCT Filed: Mar. 29, 2005

(86) PCT No.: PCT/FR2005/000748

§ 371 (c)(1),
(2), (4) Date: Jul. 13, 2007

(87) PCT Pub. No.: WO2005/093480

PCT Pub. Date: Oct. 6, 2005

(65) Prior Publication Data

US 2008/0260320 A1    Oct. 23, 2008

(30) Foreign Application Priority Data

Mar. 29, 2004    (FR) .................................. 04 50608

(51) Int. Cl.
*G02B 6/10*    (2006.01)
(52) U.S. Cl. ............................... 385/131; 385/1; 385/2; 385/3; 385/129; 385/130
(58) Field of Classification Search ................. 385/1–3, 385/129–131
See application file for complete search history.

(56) References Cited

FOREIGN PATENT DOCUMENTS

WO    WO/02069025 A2    9/2002

OTHER PUBLICATIONS

Article by Vonsovici et al.; *Modulation Doped SiGe-Si MQW for Low-Voltage High-Speed Modulators at 1.3μm*, IEEE Journal of Selected Topics in Quantum Electronics, IEEE Service Center, U.S., vol. 4, Nov. 1998, p. 1011-1019.

*Primary Examiner*—Jennifer Doan
(74) *Attorney, Agent, or Firm*—Nawrocki, Rooney & Sivertson, P.A.

(57) ABSTRACT

An optoelectronic controller for regulating an optical signal. The controller includes a ridge or rib waveguide in an SOI-type substrate. The controller also includes an active zone formed by a plurality of thin layers of silicon. The layers are either N+ type doped or P+ type doped. The zone is defined between an N+ doped zone and a P+ doped zone which together form a PIN diode. The optoelectronic controller is all-silicon and operates by carrier desertion.

13 Claims, 3 Drawing Sheets

OPTOELECTRIC HIGH FREQUENCY MODULATOR INTEGRATED ON SILICON

The present invention relates to the technological fields of communications and of electronics.

The present invention relates more particularly to an all-silicon light modulator for modulating light at optical telecommunications wavelengths (greater than 1.2 microns or micrometers (μm)). The modulator of the present invention is suitable for being integrated into an optical waveguide or "light guide" whose cross-section can be submicron in size, and can operate at high frequencies (of the order of several tens of gigahertz (GHz)). The technology used is microphotonics-on-silicon technology, which is compatible with microelectronics technology.

The modulator of the invention is made of a silicon PIN diode in which doping planes are inserted into the core of the intrinsic region (I), which doping planes bring either electrons (N-type doping) or holes (P-type doping) located non-uniformly in the structure. The resulting assembly is placed in a submicron silicon-on-insulator (SOI) optical waveguide, the doping planes being centered on the mode of the waveguide. The free carriers are removed from the structure by reverse biasing the diode, thereby resulting in a variation in the refractive index of the material, and thus in a phase variation of a light wave that is passing through it. That active zone, placed in an interferometer structure (such as a conventional device of the Fabry-Perot cavity type or of the Mach-Zehnder interferometer type) implemented in optical micro-waveguides makes it possible to obtain a modulation in the intensity of the light at frequencies of several tens of gigahertz.

It is already known from the prior art, as disclosed by International Patent Application WO 02/10816 (Centre National de la Recherche Scientifique (French National Scientific Research Center) that there exists an optical interconnection system for an integrated circuit implemented on an SOI substrate, i.e. on a substrate having a film of silicon supported by a layer of electrically insulating material, the microelectronic circuit having at least one functional block to be connected that is implemented in the film of silicon. The system comprises at least one optical micro-waveguide constituted by a strip defined in the film of silicon by lateral confinement zones for connecting the functional block.

An electro-optical modulator is also known from the prior art, as disclosed by International Patent Application WO 00/10039 (Bookham Technology). That invention relates to a doped substrate for use on either side of a ridge waveguide for the purpose of regulating the refractive index of the waveguide material. Instead of merely diffusing the dopant from the surface of the substrate adjacent to the waveguide, the substrate is etched and dopant is diffused therein from a side face of the etched region. The dopant profile is established in a horizontal direction, thereby enabling it to be controlled. A vertically uniform dopant profile can thus be obtained that guarantees a current density that is uniform in the vertical direction. If an anisotropic wet etch is applied after the initial etch, a profile is obtained that concentrates the current density at a selected height in the substrate.

An electro-optical device is also known from International Patent Application WO 02/069025 (Bookham Technology). That electro-optical device includes a semiconductive layer in which a waveguide is formed, a modulator formed across the waveguide comprising a P-doped region on one side and an n-doped region on the other side of the waveguide, at least one of the doped regions extending from the base of a recess formed in the semiconductive layer. In this way, the doped regions can extend more deeply into the semiconductive layer and can further hinder escape of charge carriers without the need to increase the diffusion distance of the dopant and incur an additional thermal burden on the device. In an SOI device, the doped region can extend to the insulating layer. Ideally, both the P-doped region and the n-doped region extend from the base of a recess, but that can be unnecessary in certain designs. Insulating layers can be used to ensure that dopant extends from the base of the recess only, giving a more clearly defined doped region. The (or each) recess can have non-vertical sides, such as are formed by v-grooved etches. A combination of a vertical sidewall at the base of the recess and of a non-vertical sidewall at the opening could be used.

Those two International Patent Applications WO 01/10039 and WO 02/069025 describe structures operating by injection of carriers. Neither of those documents discloses or even suggests the possibility of inserting doping planes for initially confining the carriers for the purpose of operating by depletion. They relate essentially to the technology for implementing the N+ and P+ zones of the diode, on either side of the waveguide, by diffusion of the dopants.

A phase modulator for a semiconductor waveguide is also known from International Patent Application WO 00/58776 (Bookham Technology). That invention relates to an optical phase modulator comprising a semiconductor rib waveguide having P-doped and n-doped regions forming a P-n junction along the path of the rib with electrodes serving to apply a reverse bias to said junction in order to extend a carrier depletion zone and thus in order to alter the refractive index. The P-n junction is offset from the central axis of the rib, but, on application of the reverse bias, the carrier depletion layer extends over a central axis of the waveguide. The structure proposed in that document is thus based on a variation in refractive index by carrier depletion in a rib waveguide. The principle of the invention that is described in that PCT Patent Application is very different from the invention that is the subject of the present Patent Application: in the prior art document, one (or more) P-n junction(s) is/are placed in the diode, thereby forming an N+/N−/P−/P+ structure, and the space charge zone of the N−/P− junction is increased by applying reverse bias to the N+/N−/P−/P+ diode. The effectiveness of such a solution is limited because the space charge zone cannot be very large, the active width is thus limited, as is the variation in the overall number of carriers. Both types of carriers (electrons and holes) are involved. The looked-for frequencies are at the best a few gigahertz. Conversely, in the present invention, a single type of carrier is used, the doped zones are narrow and easily centered on the guided optical mode. The solution of the present invention makes it possible to control the number of carriers initially present and to remove them with applied voltages of only a few volts.

An all-silicon optical modulator integrated into an SOI rib waveguide is also known in the prior art from European Patent Application EP 0 433 552 (IBM). That document relates essentially to operation by injection, with a PIN diode that is forward biased.

In the technological background of the invention, in addition to the above-mentioned patent applications, reference can be made to the following scientific publications:

R. L. Espinola et al., *Fast and low-power thermooptic switch on silicon-on-insulator*, IEEE Phot. Techn. Lett., vol. 15, October 2003, page 1366;

A. Sciuto et al., *Design, fabrication, and testing of an integrated Si-based light modulator*, Journ. Lightwave Techn., vol. 21, January 2003, page 228;

A. Irace et al., *All-silicon optoelectronic modulator with 1 GHz switching capabilities*, Electronics Letters, vol. 39, January 2003, page 232;

C. A. Barrios et al., *Electrooptic modulation of silicon-on-insulator submicrometer-size waveguide devices*, Journ. Lightwave Techn., vol. 21, October 2003, page 2332; and D. Marris et al., *Design of a SiGe/Si quantum-well optical modulator*, Journal of Selected Topics in Quantum Electronics, vol. 9, May 2003, p. 747.

An article entitled "*A high-speed silicon optical modulator based on a metal-oxide-semiconductor capacitor*" (A. Liu et al., Intel) is also known that was published in February 2004 in the scientific journal Nature. That article proposes a silicon optical modulator. An accumulation layer is formed in a metal-oxide-semiconductor (MOS) structure. No mention is made in that article of doping planes, unlike in the present invention.

Light modulators operating at frequencies of a few tens of GHz are currently made either of lithium niobate, or with III-IV semiconductors on InP substrate for optical telecommunications wavelengths (1.3 µm and about 1.55 µm), and are thus, a priori, incompatible with being integrated on a silicon substrate.

Currently, the speed of silicon-based light modulators is usually limited by the physical process implemented to frequencies of a few hundred megahertz (MHz). They usually operate by injection of free carriers rather than by desertion. The response time is then generally limited by the life of the carriers and by the thermal effects related to passing current. Recent scientific publications relating to waveguide-integrated all-silicon modulators operating by injection give response-times which are no shorter than one nanosecond. The effects of absorption in a plasma of free carriers, modulated by moving the position of said plasma under the effect of a voltage in a bipolar mode field effect transistor (BMFET) structure that is derived from the metal-oxide-semiconductor field effect transistor (MOSFET) structure, are no faster. In addition, desertion under the gate of a MOSFET is limited by the appearance of an inversion layer and is too localized to be effective. Operation based on forming an accumulation layer in a MOS capacitance gives the best results as regards speed (pass-band of 2.5 GHz), but such a layer is also of very small thickness, and is difficult to center on the optical mode of a low-loss waveguide, and thus gives limited effectiveness.

In order to obtain modulators that are faster in silicon technology, structures based on SiGE/Si multiple quantum wells, operating by desertion, have been proposed. That type of structure makes it possible to obtain response times of approximately in the range 50 to 100 ps, limited by the time taken for the carriers to be extracted from the wells. The maximum operating frequency is no higher than 12 GHz. Among the many advantages of the structure of the present invention, mention can be made in particular of the following advantages:

- operation by desertion, which makes it possible to use a small amount of electrical current (reverse biased diode), and thus to achieve low heat dissipation;
- a phenomenon that is intrinsically very rapid, of the order of a few picoseconds in submicron dimensions;
- an optimized overlap between the distribution of the free carriers and the mode of the optical guide, and thus greater sensitivity; and
- maximum compatibility with the technology of complementary metal oxide semiconductor (CMOS) microelectronic integrated circuits.

To this end, in its most general acceptation, the invention provides an optoelectronic component for controlling an optical signal, said optoelectronic component comprising a ridge or rib waveguide in an SOI-type substrate, and an active zone characterized in that said active zone is formed by a plurality of very thin layers of silicon that are either N+ type doped or P+ typed doped (Γ-doping), said zone being placed between an N+ doped zone and a P+ doped zone that form a PIN diode and that are disposed on either side of said active zone, making it possible to bias the structure.

Preferably, said layers of silicon are either all N+ type doped or all P+ type doped.

In a first variant, the doping planes are parallel to the substrate.

Advantageously, the upper electrode is offset relative to the ridge or rib of the micro-waveguide that laterally defines the active zone. The electrical contact is provided, for example, by depositing a layer of doped silicon, constituting the N+ or P+ zone of the diode, which is monocrystalline on the ridge or rib of the waveguide and polycrystalline on the insulator on either side.

Preferably, the second electrode comes into contact with the lower doped layer of silicon extending laterally beyond the active zone.

In a particular embodiment, at least one of the two electrodes comes into contact with a layer of (N+ or P+) doped silicon of the PIN diode, via a layer of silicide.

In a second variant, the doping planes are perpendicular to is the substrate, and the N+ or P+ zones of the diode are on either side of the waveguide, parallel to the ridge or rib.

The invention also provides the use of such an optoelectronic component for implementing an optoelectronic switch and for implementing an optoelectronic modulator.

The invention also relates to a method of manufacturing an optoelectronic component of the invention, said method being characterized in that it consists in epitaxially growing very thin layers of N+ or P+ doped silicon.

In a variant, the method consists in performing laser-assisted doping for forming the N+ or P+ layers in the silicon of the active zone.

The invention will be better understood on reading the following description of an embodiment of the invention given merely by way of explanation and with reference to the accompanying figures, in which.

Figure 1:
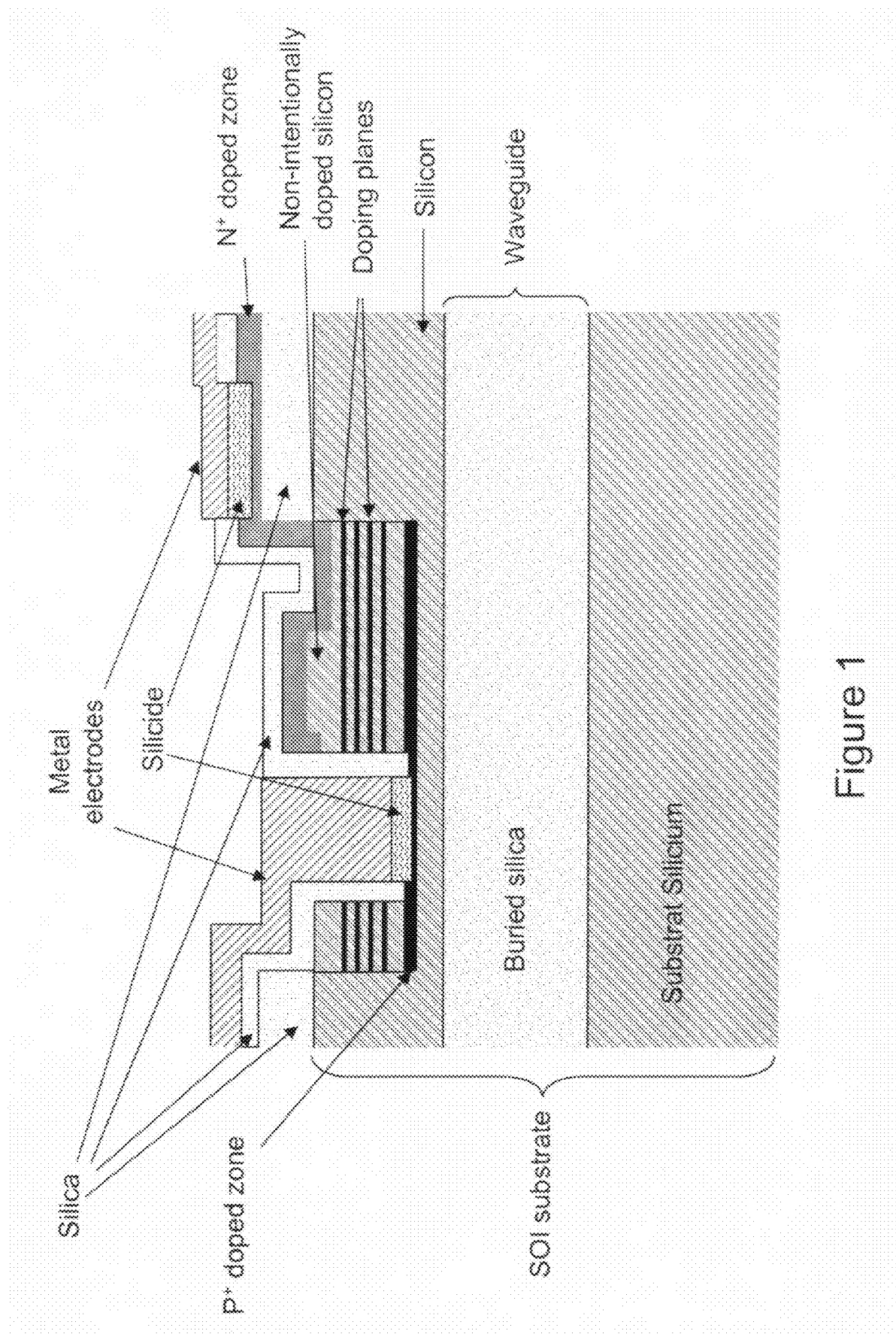
FIG. 1 shows a vertical-structure embodiment of the modulator of the invention.

Transmitting information optically requires the light intensity to be encoded, which can be achieved either by direct modulation of the source, or, preferably for high frequencies, by means of a light modulator. Optical telecommunications have been using such light modulators for a long time now, at frequencies of up to about forty GHz, made either of lithium niobate, or based on InP and on ternary or quaternary compounds (e.g. GaInAsP). Compared with such III-V semiconductors, microphotonics on silicon on insulator (SOI), constituted by a thin film of crystalline silicon, separated from the silicon substrate by a buried layer of oxide, makes it possible to achieve systems that are much more compact (light guides, multiplexers/demultiplexers, etc.) and is starting to be considered for applications in this field. Integrating a high-performance silicon modulator onto an SOI substrate makes it possible to progress in developing low-cost optical telecommunications systems.

In addition, in microelectronics, SOI substrates are starting to be used for high-performance circuits. However, increasing the frequencies of microprocessors will, in the coming years (about 5 years hence) come up against limitations resulting from the metal interconnections in the circuit, in particular for distributing the clock signal that clocks operation of the processor. The most likely alternative solution is to distribute the clock signal optically. The inventors of the present invention have shown experimentally that distributing an optical signal from one input point to 16 or 64 output points is possible, by using submicron-size silicon-on-insulator optical waveguides.

It is then necessary to have, at the input, an optical modulator that operates at frequencies of higher than 10 GHz and that can be integrated with the electronic circuit.

The present invention relates to a novel type of optoelectronic modulator that is all-silicon and that is thus suitable for being integrated with CMOS integrated circuit technology and in SOI optical micro-waveguides. Silicon modulators are based on varying the number of free carriers (electrons or (and) holes) in the structure, such variation inducing a variation in the refractive index of the material and thus leading to a phase variation of the light that passes through it. This phase variation is then transformed into an intensity variation by placing the active zone in an interferometer structure of the Fabry-Perot cavity type or of the Mach-Zehnder interferometer type, whose dimensions can be reduced by using photonic crystals.

Two solutions are possible for varying the number of carriers: either increasing said number by injection or decreasing it by desertion. In the former solution, this is accompanied by passing a current, and thus by electricity consumption and by heat dissipation. In addition, it is a phenomenon that involves both types of carrier, and thus the speed is limited by the recombination time. It is thus particularly advantageous to use desertion, even if the variation in refractive index is a little smaller. In structures of the metal oxide semiconductor field effect transistor MOSFET type, desertion of the carriers initially present under the effect of biasing the gate is limited by the appearance of an inversion layer containing the other type of carriers and is highly localized, and thus not very effective and not suitable for integration in an optical waveguide. Forming an accumulation layer yields higher performance but such a layer is also highly localized and thus offers only a small overlap with the optical mode of a waveguide.

In prior proposals for using desertion in guided structures, the free carriers are holes, localized in the vicinity of the center of the guide in SiGe/Si quantum wells separated by silicon barriers having P-type doping planes delivering said holes at equilibrium. The resulting structure is placed in a PIN diode that is reverse biased for driving the holes from the active zone (operation by desertion). However, the holes being initially trapped in the well increases the response time that is of the order of in the range 50 to 100 ps. In addition, the technology for components including quantum wells must not include steps at temperatures that are too high, which is a constraint for integration with microelectronics.

The modulator proposed is all-silicon and retains from the preceding structure only the doping planes. This original type of structure also operates by desertion, but either with holes or with electrons depending on the type of doping used in the planes. Inserting doping planes suffices to locate the free carriers in their immediate vicinity by internal field effect, and the carriers no longer have any potential barrier to cross in order to be swept from the active zone. The response time is thus much shorter, and of the order of a few picoseconds. The expected variations in refractive index are of the order of some $10^{-4}$ for applied voltages of a few volts, and a little higher than with SiGe/Si quantum wells. They are accompanied by a variation in absorption which can also be used for the modulation.

III-V semiconductor materials are fragile and costly and their substrates remain of limited size. These devices are not easy to integrate monolithically on silicon substrates.

A silicon modulator enjoys microelectronics technology, with which it can be integrated, with a low cost, and with mass production being possible on substrates of from 200 to 300 mm in diameter.

Prior art silicon modulators that are either all-silicon operating by injection of carriers or by displacement of a plasma, or that are with SiGe/Si quantum wells operating in desertion, have operating frequencies that are too low for the applications in question.

The present invention proposes an all-silicon modulator that is compatible with CMOS technology, that can be integrated into an SOI micro-waveguide, and that has intrinsic response times of a few picoseconds.

Two methods of making the modulator of the invention are described below: one of the methods relating to a vertical structure (shown in FIG. 1), and the other method relating to a horizontal structure (shown in FIG. 2).

In order to integrate the modulator into an optical waveguide, the substrate is of the SOI type (Silicon On Insulator), the buried silica (silicon dioxide) layer making it possible to confine the electromagnetic field to the surface film of silicon that performs the guiding. The active structure is thus inserted into a trough etched in the film of silicon of the SOI substrate, thereby maximizing the thickness of silicon left for resuming epitaxy (typically τ30 nm).

The structure as a whole is then formed by selective epitaxial growth. Various types of epitaxy can be used: it is thus possible to use Ultra High Vacuum Chemical Vapor Deposition (UHV-CVD) or Reduced Pressure Chemical Vapor Deposition (RP-CVD). The latter method allows deposition to be achieved faster and is thus better suited to industrial development. In both cases, it is possible to choose chemical techniques and deposition conditions that give preference to selectivity: the deposition takes place on the silicon only, and not on the silica, which can have served as a mask for etching the trough. It is also possible to use chemical techniques leading to non-selective deposition: the silicon is deposited everywhere and the structure is then shaved down by Chemical Mechanical Polishing (CMP) which leaves the epitaxially grown layers in the trough only.

For forming the PIN diode, the P+ layer is preferably deposited first, at the bottom of the trough, but the structure can also be inverted, with the N+ layer at the bottom. The non-intentionally doped silicon is then grown (crystalline by epitaxy), in which doping planes are inserted that are fine layers of silicon (typically from 5 nm to 10 nm in thickness) which are either P-type doped or n-type doped, with a concentration of carriers of the order of some $10^{18}$ cm$^{-3}$. Forming the diode terminates with an N+ type layer (or with a P+ type layer for the inverted structure). The N+ and P+ contact layers must be quite fine and relatively low-doped compared with the usual contact layers in order to limit the losses of the optical mode by absorption on the free carriers, as for the structure with the SiGe wells, as is mentioned in the publication entitled *Design of a SiGei-Si Quantum-Well Optical Modulator* (Delphine Marris et al., IEEE Journal of Selected Topics in Quantum Electronics, Vol. 9, No. 2, May-June 2003). The P-doping is obtained with boron in general, and the n-doping is obtained in general with arsenic or with phosphorus.

Since the lateral confinement of the guided mode is achieved by defining a ridge or rib, the ridge or rib needs to be etched, by anisotropic etching, e.g. by Reactive Ion Etching (RIE). In addition, in order to avoid prohibitive losses on the metal of the electrodes, it is necessary to offset the electrical contact relative to said ridge or rib. A solution is thus to etch the ridge or rib before the growth of the upper N+ doped layer (P+ doped layer for the inverted structure). This layer is formed by resumption of epitaxy using non-selective chemistry for depositing a layer of N+ doped silicon (P+ doped silicon for the inverted structure), which is crystalline on the silicon and polycrystalline on the silica, and which makes it possible to provide electrical continuity to an electrode placed above the silica.

The next step consists in etching a trench along the ridge or rib of the optical waveguide for the purpose of going to make electrical contact with the P+ layer (the N+ layer for the inverted structure), and in insulating the sides of the trench by depositing silica. Windows are opened in the silica for the purpose of depositing metal for the two electrodes.

Prior to depositing metal, it is advantageously possible to improve the electrical contact by forming a silicide, e.g. a nickel or platinum silicide. The metal is then deposited, and then etched to remove it outside the zones constituting the electrodes.

Resuming non-selective epitaxial growth for the upper doped layer, making it possible to offset the electrical contact to the side of the ridge or rib of the waveguide, is a particularly important step in the method described herein. This step is not known from the technical documents and publications of the prior art.

Figure 2:
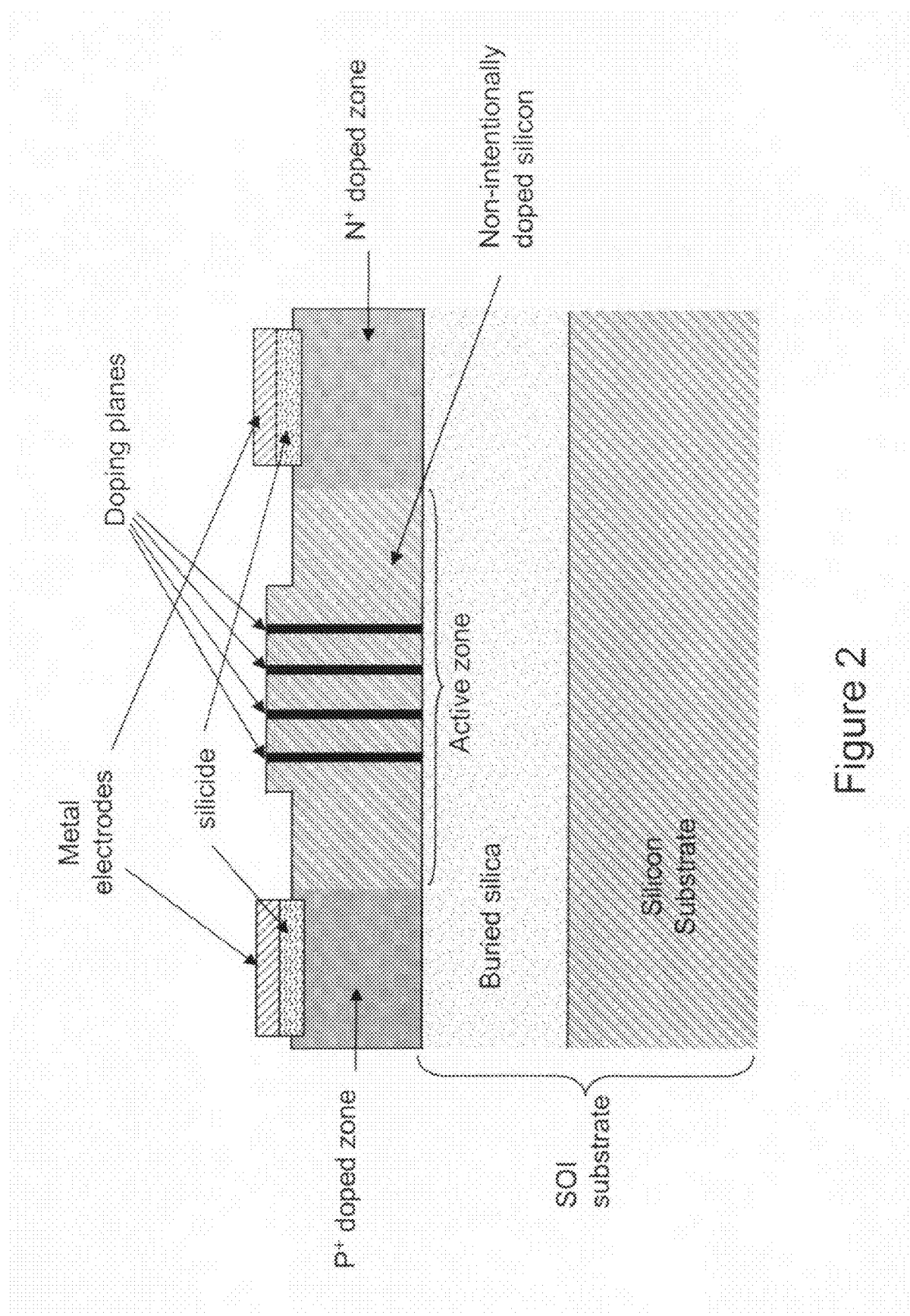
FIG. 2 shows a horizontal-structure embodiment of the modulator of the invention.
Figure 3:
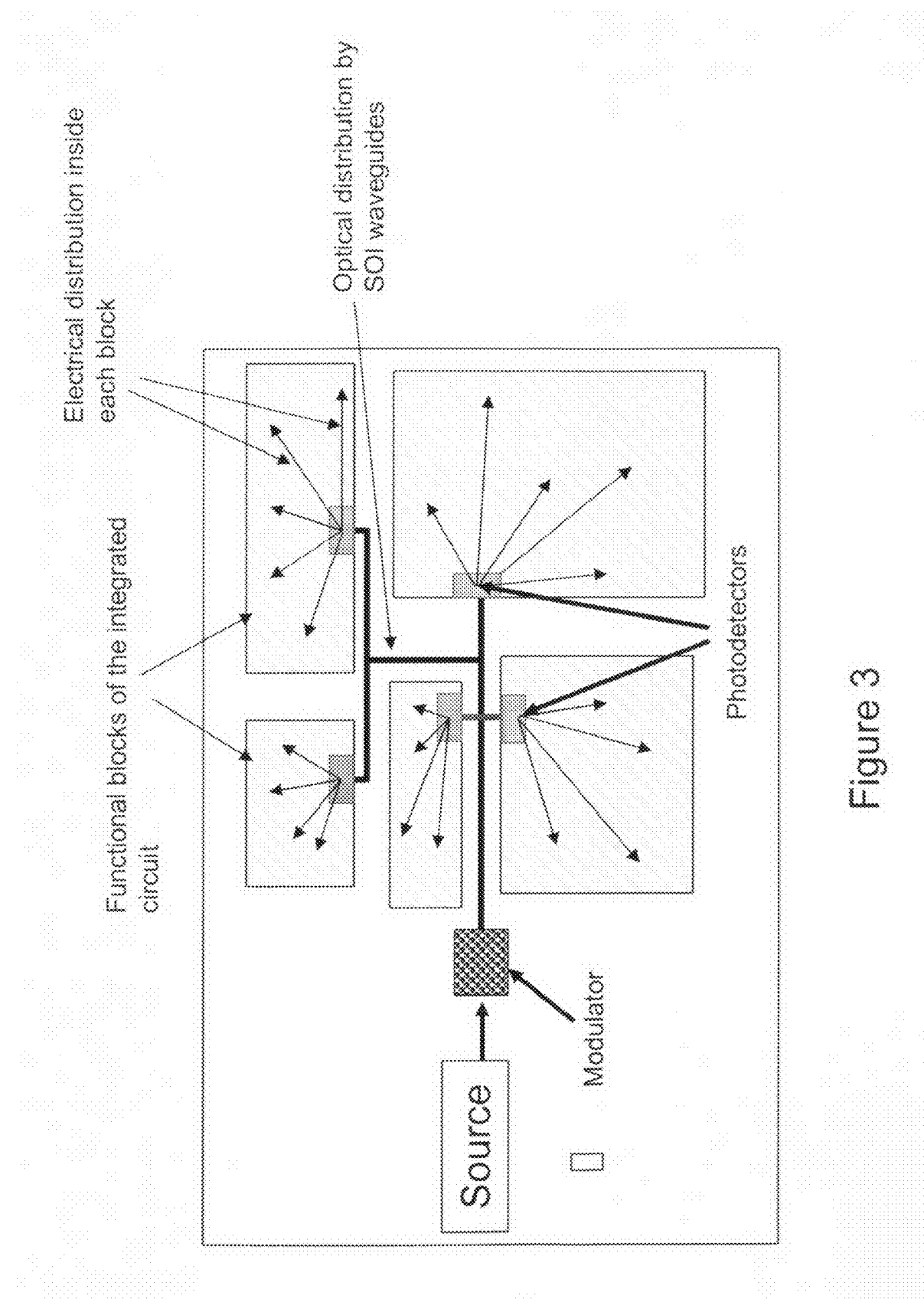
FIG. 3 shows the use of the modulator of the invention in optical signal distribution in the context of a microelectronic integrated circuit.

Another solution consists in forming vertical doping planes, the PIN diode then finding itself horizontal rather than vertical, as shown in FIG. 2.

In this embodiment, the technology is different and particularly original. In an advantageous variant, the doping planes can be implemented by means of the laser doping technique. This technique makes it possible to incorporate the dopants over thicknesses of a few hundreds of nanometers and over a width that can be less than 100 nm. This technique is based on localized melting of the silicon in the presence of a gas such as di-borane (for example) for boron (P-doping), and arsine or phosphine for As or P (n-doping). The P+ and N+ contact zones of the diode can be implemented by using the same technique.

Then, the following steps are to be implemented:
mask for the P-type doping;
mask for the n-type doping;
deposition of silica; and
   openings for making contact (forming the silicide and metal-plating).

In another variant, the structure could be formed by lateral epitaxial growth starting from a vertical face defined in the (100) crystalline direction.

One of the advantages of the horizontal structure consists in the contact zones being spaced apart from the optical mode, thereby causing a significant reduction in optical propagation losses, it being possible for the contacts to be doped to a greater extent in order to reduce their resistance, which is involved in the response time by RC-type time constants.

The invention is described above by way of example. It should be understood that the person skilled in the art is capable of implementing various variants of the invention without going beyond the ambit of the patent.

The invention claimed is:

1. An optoelectronic component for controlling an optical signal, said optoelectronic component comprising a ridge or rib waveguide in an SOI-type substrate, and an active zone characterized in that said active zone is formed by a plurality of very thin layers of silicon that are either all N+ type doped or all P+ typed doped (Γ-doping), said zone being placed between an N+ doped zone and a P+ doped zone that form a PIN diode and are disposed on either side of said active zone, making it possible to bias the structure, said optoelectronic component being further characterized in that it is all-silicon and in that it operates by carrier desertion.

2. An optoelectronic component according to claim 1, characterized in that doping planes are parallel to the substrate.

3. An optoelectronic component according to claim 2, characterized in that an upper electrode is offset laterally relative to the active zone defined by the ridge or rib of the micro-waveguide.

4. An optoelectronic component according to claim 2, characterized in that a second electrode comes into contact with a lower doped layer of silicon extending laterally beyond the active zone.

5. An optoelectronic component according to claim 1, characterized in that at least one of the two electrodes comes into contact with a layer of (N+ or P+) doped silicon via a layer of silicide.

6. An optoelectronic component according to claim 1, characterized in that doping planes are perpendicular to the substrate.

7. An optoelectronic component according to claim 1, characterized in that it is manufactured using a method consisting in epitaxially growing very thin N+ or P+ (Γ-doping) layers of silicon.

8. An optoelectronic component according to claim 1, characterized in that it is manufactured using a method employing forming N+ or P+ doping planes by laser doping.

9. The use of an optoelectronic component according to claim 1 for implementing an optoelectronic switch.

10. The use of an optoelectronic component according to claim 1 for implementing an optoelectronic modulator.

11. An optoelectronic component for controlling an optical signal, said optoelectronic component comprising a ridge or rib waveguide in an SOI-type substrate, and an active zone characterized in that said active zone is formed by a plurality of very thin layers of silicon that are either N+ type doped or P+ typed doped (Γ-doping), said zone being placed between an N+ doped zone and a P+ doped zone that form a PIN diode and are disposed on either side of said active zone, making it possible to bias the structure, said optoelectronic component being further characterized in that it is all-silicon and in that it operates by carrier desertion;
   characterized in that said layers of silicon are either all N+ type doped or all P+ type doped; and
   characterized in that a second electrode comes into contact with a lower doped layer of silicon extending laterally beyond the active zone.

12. An optoelectronic component for controlling an optical signal, said optoelectronic component comprising a ridge or rib waveguide in an SOI-type substrate, and an active zone characterized in that said active zone is formed by a plurality of very thin layers of silicon that are either N+ type doped or P+ typed doped (Γ-doping), said zone being placed between an N+ doped zone and a P+ doped zone that form a PIN diode and are disposed on either side of said active zone, making it possible to bias the structure, said optoelectronic component being further characterized in that it is all-silicon and in that it operates by carrier desertion;
   characterized in that the doping planes are parallel to the substrate; and characterized in that an upper electrode is offset laterally relative to the active zone defined by the ridge or rib of the micro-waveguide.

13. An optoelectronic component for controlling an optical signal, said optoelectronic component comprising a ridge or rib waveguide in an SOI-type substrate, and an active zone characterized in that said active zone is formed by a plurality of very thin layers of silicon that are either N+ type doped or P+ typed doped (Γ-doping), said zone being placed between an N+ doped zone and a P+ doped zone that form a PIN diode and are disposed on either side of said active zone, making it possible to bias the structure, said optoelectronic component being further characterized in that it is all-silicon and in that it operates by carrier desertion; and characterized in that at least one of the two electrodes comes into contact with a layer of (N+ or P+) doped silicon via a layer of silicide.

* * * * *